Sept. 7, 1937.   F. G. HODSDON   2,092,605
TEAT CUP AND LINER FOR MILKERS
Filed March 23, 1936
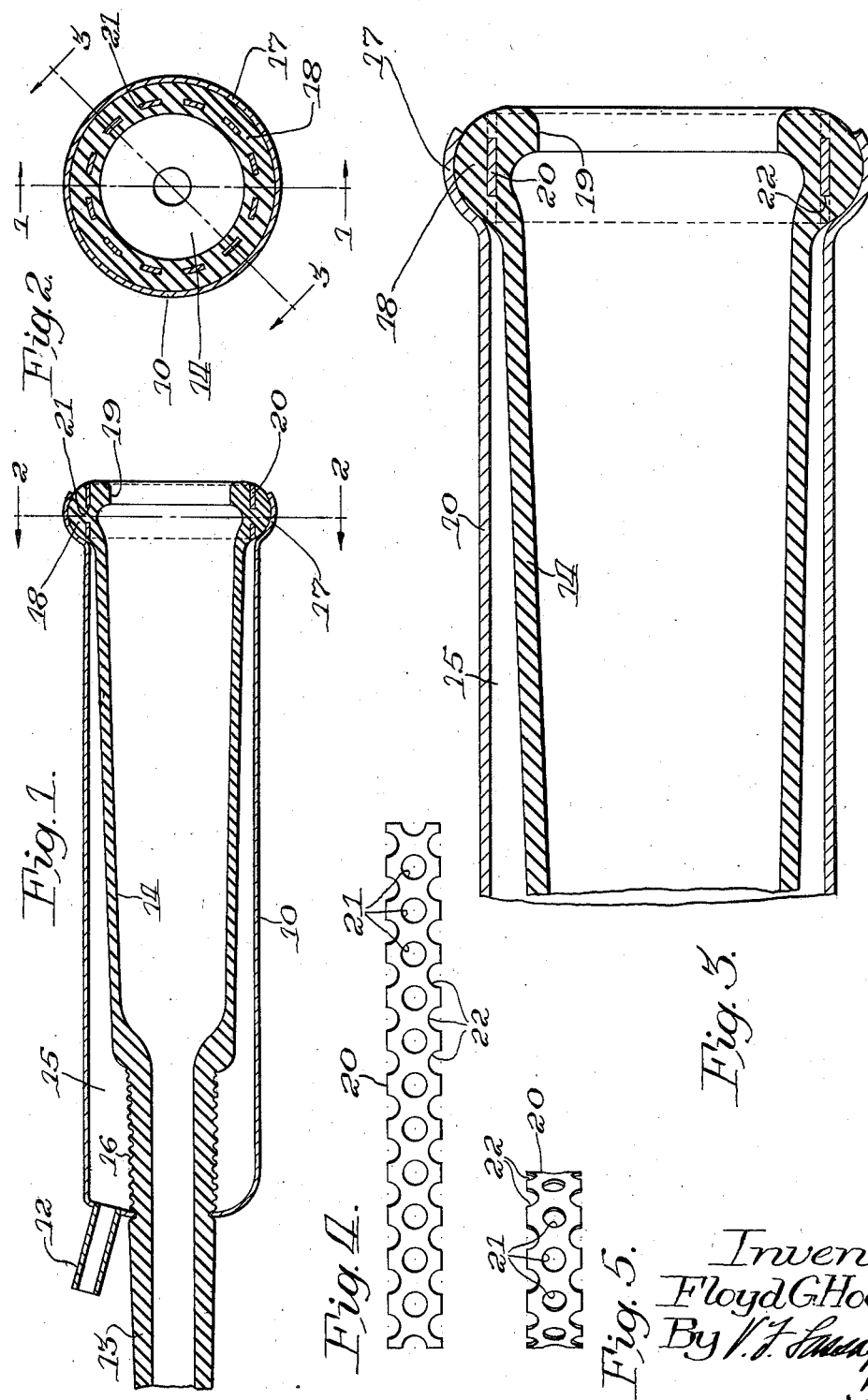
Inventor
Floyd G. Hodsdon
By V. J. Lavagne
Atty.

Patented Sept. 7, 1937

2,092,605

UNITED STATES PATENT OFFICE 2,092,605

TEAT CUP AND LINER FOR MILKERS

Floyd G. Hodsdon, Milwaukee, Wis., assignor to International Harvester Company, a corporation of New Jersey Application March 23, 1936, Serial No. 70,236

7 Claims. (Cl. 31—85)

The invention relates to an improved teat cup and rubber liner or inflation member for use therewith in milking machines.

To facilitate fast milking, manufacturers of milking machines sometimes make the metal cup or shell unusually heavy to add weight. This extra weight has a disadvantage in that it sometimes causes the cups accidentally to fall off the teats. Also, it is found, where the upper end of the rubber inflation liner is stretched and snapped back over the lip of the cup, that objectionable cuts appear caused by accidentally striking a hard object. To overcome this cutting of the rubber, the head of the liner inflation had been thickened to such an extent that still more weight is added, which necessitates rather too far apart spacing of the four cups composing the unit for milking cows with some teats located close together.

To overcome these difficulties the present invention provides a rubber liner having a beaded upper end to fit snugly within a grooved rim formed at the upper end of the cup or shell. The fit must be air tight and secure, so that, when removing the cups from the teats, the liners will not accidentally separate from the cups. Accordingly, a special metal insert is molded in the beaded upper edge of the liner to insure a tight and snug assembly of liner and cup. This structure results in a small outside diameter to allow proper and easy milking of teats that are close together. The grip between the liner and cup is such that they can be readily separated for cleansing purposes.

The main object of the invention is to provide an improved assembly of teat cup and liner.

Another object is to provide an improved teat cup liner or inflation.

Still another object is to provide an improved liner for the purpose stated having a beaded or thickened upper edge including an imbedded flexible, metallic, strengthening insert.

Other important objects will be apparent to those skilled in this art as the disclosure is more fully made.

An illustrative example, which is a desirable, practicable form of the invention, is shown in the accompanying sheet of drawing, wherein:

Figure 1 is a general longitudinal sectional view through the assembled teat cup shell and improved liner, taken along the line 1—1 of Figure 2, looking in the direction of the arrows;

Figure 2 is a cross sectional view through the head end of the assembly, taken along the line 2—2 of Figure 1, looking in the direction of the arrows;

Figure 3 is an enlarged sectional view through the assembly taken along the line 3—3 of Figure 2, looking in the indicated direction;

Figure 4 is a developed plan view of the metal insert reenforcing ring; and,

Figure 5 is an elevational view of the formed ring.

The teat cup shell is shown at 10 and comprises a metal tube having its lower end cupped and including a conduit 12 adjacent one edge thereof. The center of the cup is formed with a central aperture, through which is passed the tail 13 of a teat cup liner or rubber inflation member 14, located centrally within the shell to provide a chamber 15 which in the usual manner, by means of a pulsator, not shown, has alternately delivered thereinto through the conduit 12, air pressure and relative vacuum. The tail end of the liner member, as at 16, is molded to form corrugated rings cooperable with the edge of the opening through which it is passed in the cup to permit adjusting the tension of the liner in the cup in a manner well known in the art.

The upper or head end of the teat shell is bent to form a radially outwardly beaded upper lip or rim portion, as at 17, and the upper end of the liner 14 is molded into a thickened or beaded edge 18 for snugly fitting the groove provided by the rim part 17. The end of the liner at 19, of course, is open to permit entrance of a teat and insertion thereof in the usual way into the liner.

In the process of molding this bead 18 with the liner there is embedded in said bead a spring steel metal ring, generally shown at 20 in Figure 5. This ring is developed from a flat blank shown in Figure 4, and is provided with a spaced series of holes 21 and opposite edges between the holes are provided with scalloped portions 22. This blank, so formed, is then curled into a cylindrical ring, and the abutting ends are secured together as by welding or soldering. This ring is permanently imbedded in the bead 18 by molding, so that the rubber flows through the holes 21 and securely interlocks therewith, the position of the ring being perhaps best illustrated in Figure 3. The legs formed in the ring between the scallops serve to support the ring in the mold when forming the thickened securing edge of the liner. Obviously, this flat ring 20 serves to reenforce the attaching end of the liner and makes it certain that the bead 18 will tightly and resiliently grip the shell groove 17 with an air tight sealing grip. The bead 18 with its reenforcing ring 20, preferably made of rustless metal, is rigidly held in the groove 17 of the cup during milking and, when the teat cups are taken off the cow, the liner will not accidentally pull free of the cup. It is important to note that this ring 20 is disposed axially of the teat cup 10 and that the ring is of a depth substantially equal to the axial depth of the bead 18. However in washing and cleansing the parts, it is found that, by an easy pull of the thumb and fingers, the liner can be released from the shell or cup.

It is the intention to cover herein any changes and modifications of the example herein shown and described for the purposes of disclosure, which do not in material respects depart from the spirit and scope of the invention as covered by the following claims.

What is claimed is:

1. The combination with a teat cup shell having its upper end formed with an inside groove, of a rubber inflation element carried by the shell comprising a tubular liner having its upper end formed with a thickened bead to fit snugly within the groove on the inside of the shell, said bead imbedding a flat metal cylindrical ferrule extending parallel with the longitudinal axis of the shell for reenforcing the bead.

2. The combination with a teat cup shell having its upper end formed with an inside groove, of a rubber inflation element carried by the shell comprising a tubular liner having its upper end formed with a thickened bead to fit snugly within the groove on the inside of the shell, said bead imbedding a cylindrical metal ferrule for reenforcing the bead, said ferrule extending in the same axial direction as the shell and having apertures therein at spaced intervals.

3. The combination with a teat cup shell having its upper end formed with an inside groove, of a rubber inflation element carried by the shell comprising a tubular liner having its upper end formed with a thickened bead to fit snugly within the groove on the inside of the shell, said bead imbedding a cylindrical ferrule for reenforcing the bead, said ferrule having its edges scalloped.

4. The combination with a teat cup shell having its upper end formed with an inside groove, of a rubber inflation element carried by the shell comprising a tubular liner having its upper end formed with a thickened bead to fit snugly within the groove on the inside of the shell, said bead imbedding a cylindrical metal ferrule for reenforcing the bead, said ferrule being disposed in the same axial direction as the shell and having openings formed therethrough and one edge scalloped.

5. The combination with a teat cup shell having its upper end formed with an inside groove, of a rubber inflation element carried by the shell comprising a tubular liner having its upper end formed with a thickened bead to fit snugly within the groove on the inside of the shell, said bead imbedding a cylindrical spring metal ferrule for reenforcing the bead, said ferrule lying in the direction of the length of the shell.

6. The combination with a teat cup shell having its upper end formed with an inside groove, of a rubber inflation element carried by the shell comprising a tubular liner having its upper end formed with a thickened bead to fit snugly within the groove on the inside of the shell, and a cylindrical metal insert imbedded in the bead, said insert lying parallel with the axis of the shell and extending substantially through the thickness of said bead and diametrically across said inside groove.

7. The combination with a cylindrical teat cup shell having its upper end bowed radially outwardly to provide an inside groove of semicircular cross section, of a rubber inflation element carried by the shell comprising a tubular liner having one end passed through an end of the cup shell and the other end formed with a thickened bead to fit snugly in the inside groove, and a cylindrical reenforcing insert molded into the bead and extending substantially diametrically across the inside groove when the liner is mounted in the shell and the insert being further disposed in the same axial direction as the axis of the cylindrical shell.

FLOYD G. HODSDON.